United States Patent [19]

Zayat

[11] Patent Number: 4,554,957
[45] Date of Patent: Nov. 26, 1985

[54] ROTARY RESURFACING TOOL

[76] Inventor: Charles Zayat, 100 New Hampshire St., Cranston, R.I. 02920

[21] Appl. No.: 578,855

[22] Filed: Feb. 10, 1984

[51] Int. Cl.⁴ .............................................. B27C 9/02
[52] U.S. Cl. .................................. 144/2 R; 83/837; 144/115; 144/218
[58] Field of Search ........... 144/134 R, 134 D, 136 C, 144/2 R, 114 R, 115, 218; 83/837

[56] References Cited

U.S. PATENT DOCUMENTS

| | | | |
|---|---|---|---|
| 2,610,658 | 9/1952 | Koeling | 144/136 C |
| 2,741,282 | 4/1956 | Wieting | 144/136 C |
| 2,952,281 | 9/1960 | Weber | 144/134 D |
| 3,537,491 | 11/1970 | Kolesh | 83/837 |

Primary Examiner—W. D. Bray
Attorney, Agent, or Firm—Robert J. Doherty

[57] ABSTRACT

A tool for simultaneously resurfacing by cutting the face and overlying butt portions of shingles or clapboards forming the outside surface of a house or the like. The tool includes a housing in which a rotatable cutting disc is mounted for rotation such that two different cutting surfaces can simultaneously engage the surface, that is, the aforementioned clapboard or shingle surfaces simultaneously. The housing includes first guide means to separately position a series of first cutters such that the major face of the work surface is cut to the desired depth and separate second guide means to simultaneously regulate the depth to which the second cutters may engage the overlying or butt portions of the shingles or clapboards forming the work surface.

5 Claims, 6 Drawing Figures

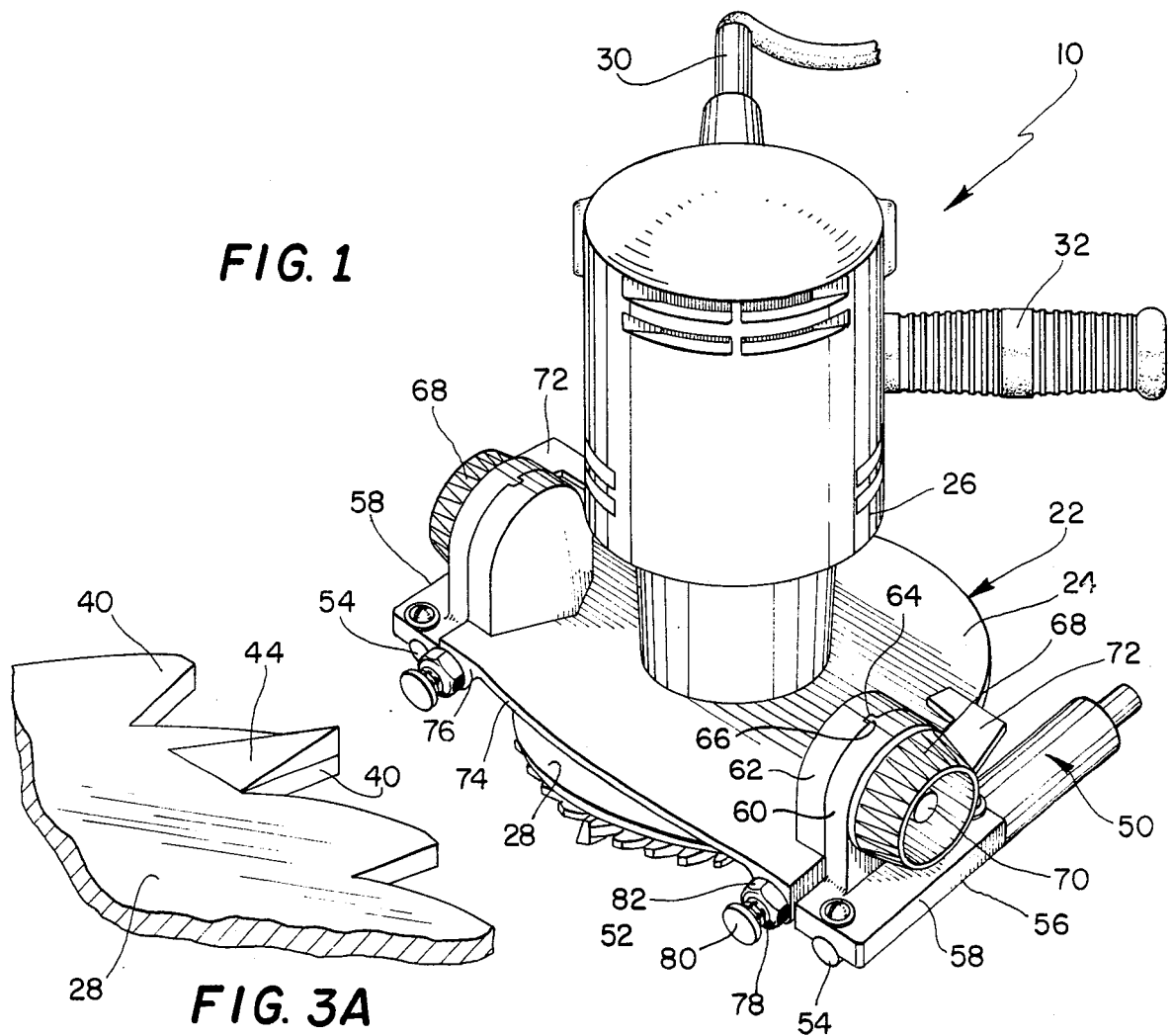
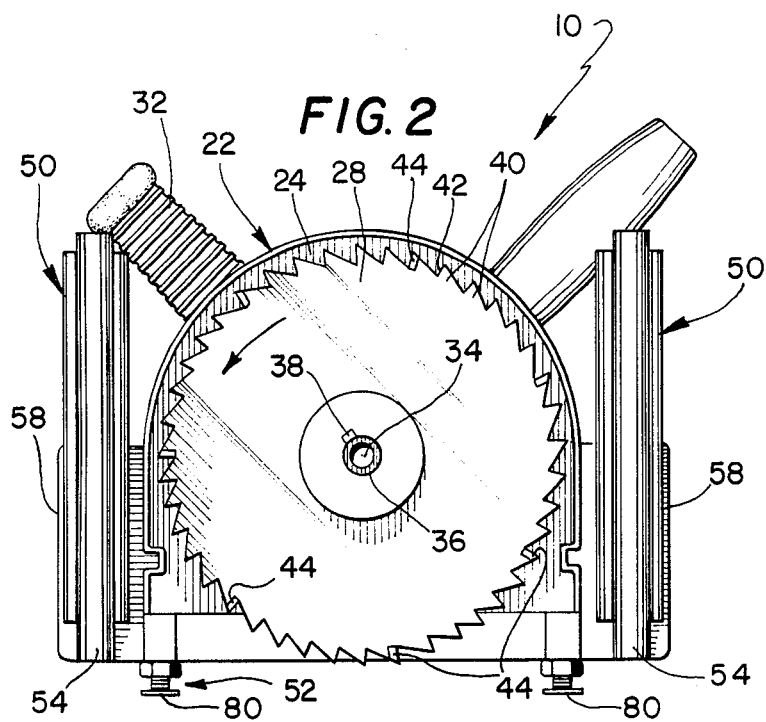
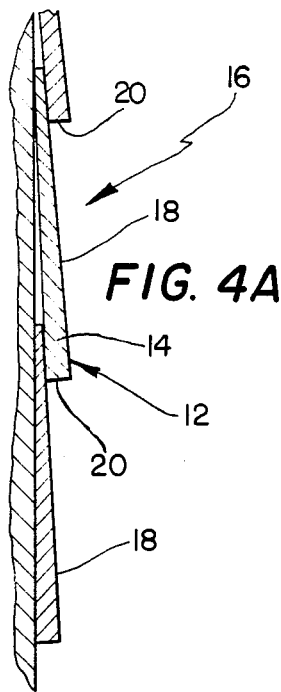

ROTARY RESURFACING TOOL

BACKGROUND AND OBJECTS OF THE INVENTION

This invention is generally related to a device for resurfacing the outside surface of a house or other building which includes clapboards, shingles or other siding which presents both a major flat surface and a minor overlying abutting surface. More particularly, the invention is directed to a conveniently manipulatable hand tool which can remove paint and other surface coatings from such siding in a direct and effective manner while insuring that too much surface is not removed.

There are a variety of ways of removing paint and other surface accumulations from wooden siding and the like. Such ways include chemical, thermal, and mechanical removal of such surface coatings. Chemical paint removers operate by softening, dissolving or otherwise degrading the paint film so as it can be flushed or scraped from the surface. Thermal paint removers are also slow and expensive and additionally can expose both the siding and underlying wood surfaces to ignition temperatures, thus creating a possible fire hazard. Mechanical paint removers generally include the use of abrasive sheets, i.e., sandpaper, wherein friction and abrasion of hard particular matter against the paint film is used to remove such. Such removal method tends to clog the sandpaper necessitating considerable down time of cleaning or changing sandpaper. Other mechanical devices include wire brushes and the like as well as hand scrapers both of which have drawbacks in that they can damage the siding surface by gouging and the like as well as being particularly labor intensive.

It is, accordingly, an object of the present invention to provide a tool which can be used to remove paint or other surface accumulations from siding and the like which overcomes the above-indicated deficiencies and which is easy to operate, efficient and of moderate labor intensity and accordingly cost. These and other objects of the present invention are accomplished by the provision of a rotary tool for resurfacing a work surface such as a painted shingle or clapboard wall defining a generally flat vertically oriented major surface and an adjacent overlying horizontally oriented minor surface, said tool comprising a housing, a rotatable cutting disc having a generally planar face and a peripheral edge surface, said disc rotatably supported by said housing and means for rotating said disc at high speed about an axis substantially perpendicular to said work surface, said disc face and said peripheral edge surface having outwardly extending first and second cutting surfaces respectively provided thereon such that said rotation permits simultaneous cutting of said major and minor surfaces, said housing further including first and second adjustable guide means adapted to respectively engage said major and minor surfaces so as to regulate the depth to which said disc cuts said major and minor surfaces.

Other objects, features and advantages of the invention shall become apparent as the description thereof proceeds when considered in connection with the accompanying illustrative drawing.

DESCRIPTION OF THE DRAWINGS

In the drawings which illustrate the best mode presently contemplated for carrying out the present invention:

FIG. 1 is a perspective view showing one form of the device of the present invention;

FIG. 2 is a front elevational view of the device of FIG. 1 shown in a reverse or upsidedown position;

FIG. 3a is an enlarged partial perspective view showing the construction of a dual purpose tooth;

FIG. 4a is a side sectional view thereof which shows the major and minor surfaces of the wall surface to be treated.

DESCRIPTION OF THE INVENTION

Figure 3:
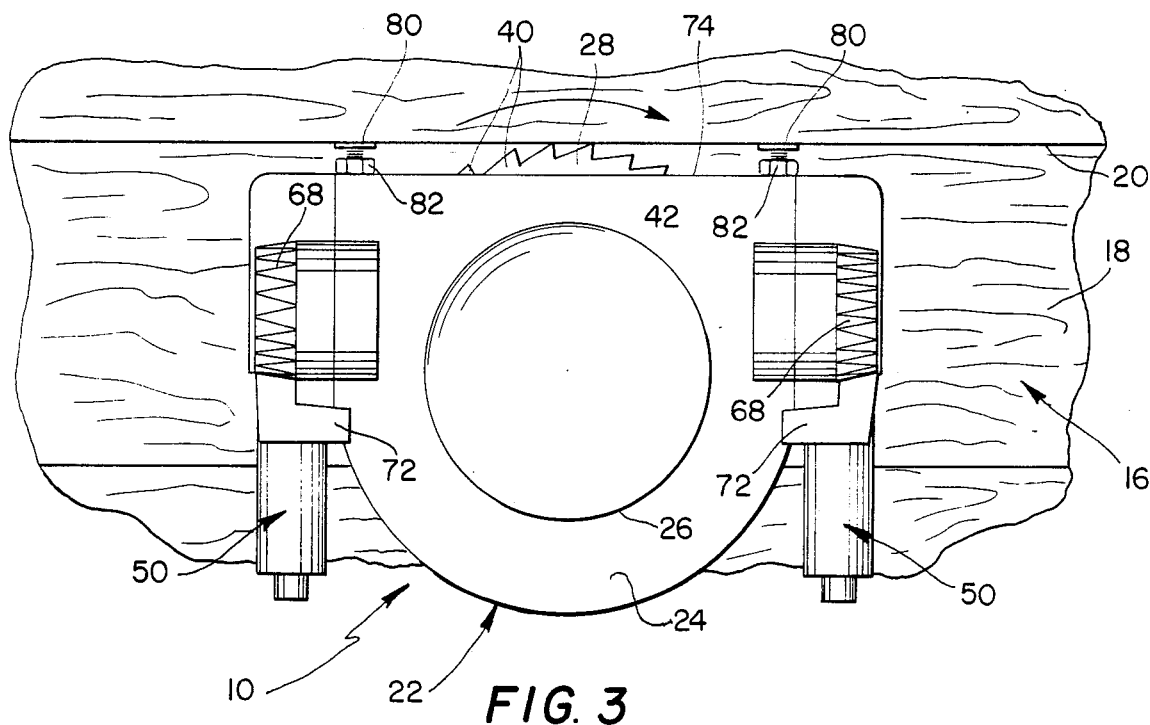
FIG. 3 is a rear elevational view of the device shown in its operable position.
Figure 4:
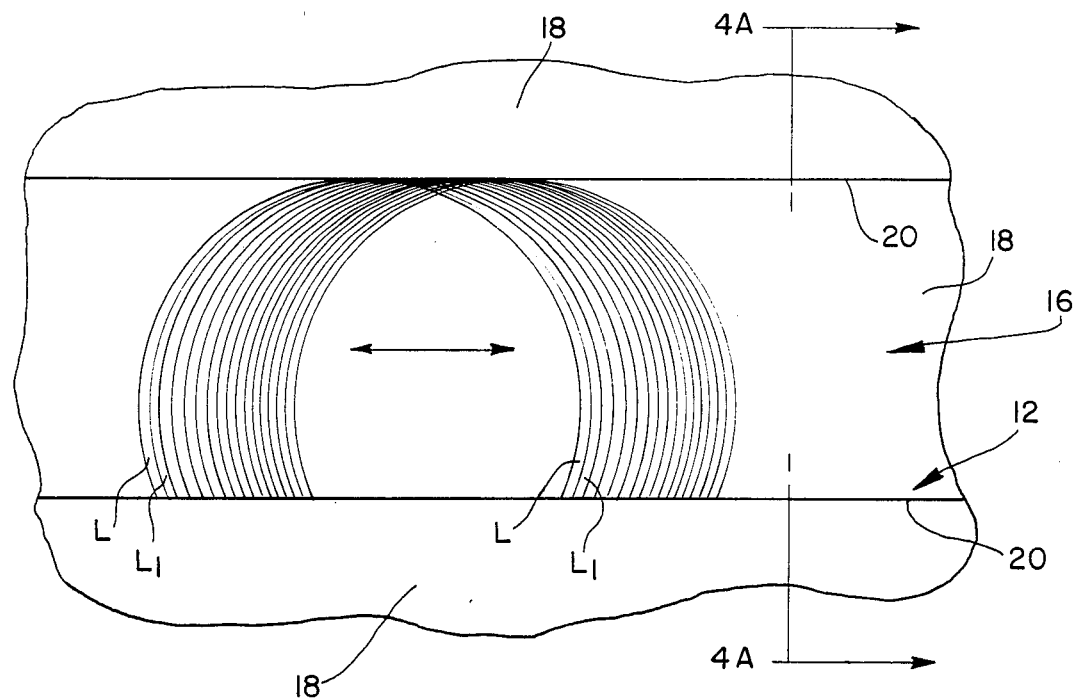
FIG. 4 is an elevational view of a wall surface showing the manner in which the device of the present invention is utilized to remove surface portions thereof.

The device 10 of the present invention is normally adapted to be hand held and placed against the surface of the siding 12 either in the form of shingles or clapboards 14 forming the outer face of a housing wall 16. Such shingles or clapboards 14 include a plurality of vertically abutting horizontally aligned runs which when assembled form the composite siding 12. Each run of shingle or clapboard exhibits a face or major portion 18 which is generally vertically aligned with respect to the wall 16 and an abutting or end surface 20 of the siding run immediately thereabove and adjacent thereto. Such butt surface 20 is designated as a minor surface and is generally horizontally oriented with respect to the wall surface 16. Generally the siding is of wood and painted but other materials and surface coatings may be equally applicable for treatment by the device 10.

Turning now to FIGS. 1 through 3 of the drawings, the structure of the device or tool 10 of the present invention is best illustrated. Therein a housing 22 including a generally planar central plate and the like is adapted to receive a conventional rotary motor 26 on one side thereof and a rotatable cutting disc 28 on the other side thereof. In that regard, the motor 26 is mounted to the plate 24 by any conventional means such as screws or other connectors such that the motor and plate act as a unitary assembly. The motor is in turn provided with a source of power such as the electrical cord 30 as well as a rugged handle 32 fixedly connected thereto whereby the overall tool 10 may be conveniently manipulated in the intended manner. A centrally located hole (not shown) is provided through the plate 24 such that the motor shaft 34 may pass therethrough and be connected to the cutting disc 28 via a conventional connector such as the outwardly extending hub 36 through which a set screw 38 projects. It should be pointed out that other conventional means may be utilized to connect the cutting disc 28 to the motor and that additionally the rear surface of the cutter disc 28 is spaced from the adjacent rear surface of the plate 24.

The cutter disc 28 is provided with a series of aligned saw-tooth blades having cutting surfaces 42 aligned in the direction of rotation of the disc as shown by the arrows in FIGS. 2 and 3 and which outwardly extend from its peripheral surface. It is not necessary that there be a great many of such teeth 40, however, a standard rotary cutter as commercially available may be utilized when modified as hereinafter explained. In that regard, a number of the teeth 40 which are arcuately spaced from each other are provided with an additional cutter surface 44 which outwardly extends from the face of the disc 28 so as to project towards the housing wall 16 when positioned in its use attitude. Seven such additional blades 44 are depicted, however, it should be explained that fewer or less of such additional blade surfaces may be provided and that they may be of greater radial extent than depicted, that is, they may extend towards the central portion of the disc 28 and in that regard do not necessarily have to be formed as part of the blades 40. The important aspect is that there are two sets of blade surfaces—one which projects upwardly from the flat outer surface of the disc 28, namely, the blades 44 hereinafter referred to as the first cutting surfaces and which are adapted to engage in a cutting relationship with the major siding surfaces 18 and a series of second cutting surfaces which are radially disposed on the periphery of disc 28 (namely, cutter teeth 40) which are adapted to simultaneously contact and cut the minor siding surfaces 20.

In order to guide the first and second cutters in the desired relationship vis-a-vis the siding surface 16 first and second adjustable guide means respectively are provided on the housing 22 and are adapted to engage the major and minor surfaces 18 and 20 respectively. The first guide means is designated by the reference numeral 50.

The first guide means 50 includes a contact element 54 which may be in the form of a vertically oriented rod adapted to contact the siding surface 18. The contact elements 54 are provided on opposite ends of the plate 24 and are spaced so as to provide adequate room for the cutter disc 28 positioned therebetween. Each of the contact elements is provided with a first adjusting means 56 including a sub plate 58 which is connected to the element 54 and in turn having an inwardly or upwardly extending ear 60. The ear 60 is in turn adapted to slide in and out with respect to an upstanding boss 62 provided on the plate 24. The boss 62 is in turn provided with a groove 64 in which a projection 66 of the ear 60 is adapted to engage, much in the manner of a key way.

A knurled nut 68 is adapted to threadably engage a shaft 70 which in turn outwardly extends from the boss 62. The knurled nut 68 is also provided with a handle 70 so as to insure the tightening of the nut 68 towards the boss 62 and thus positively engage the ear 60. This arrangement enables back and forward adjustment of the sub-plate 58. Such plate 58 is adjusted so that the contact of the guides 54 against the major surface 18 of the siding 12 will permit the desired amount of cutting action to take place to insure that all the surface paint and accumulation desired to be removed is so done by the rotational cutting action of the cutter disc 28. It should be brought out that it is the first cutters, namely, the blades 44 that engage the major surface 18, and the depth to which they subsequently cut that surface is controlled by the first guide means 50. The manner in which the blades 44 cut into the generally planar major surface 18 is illustrated by the plurality of partial circular paths L. These paths represent the circular cut taken by the blades 44 as the disc 28 rotates. The path describes a partial circle since the disc illustrated is of a diameter greater than the exposed height of the shingle or clapboard (major surface 18). As the tool moves across the surface 18, it forms added adjacent cut paths, e.g., path L', until the entire surface is cut as intended.

The second guide means 52 is used to position the device 10 vertically with respect to the siding 16. In such regard, the upper edge 74 of the plate 24 is provided with enlarged tabs 76 on either end thereof. A guide post 78 having a flatened head 80 is threadably engaged into the tabs 76 and locked in the desired position by a lock nut 82. The flatened surface 80 is adapted to engage the abutting surface 20 of the adjacent higher siding run such that the second cutting surfaces, namely, the teeth 40 will engage and remove the desired depth of material when the cutter blade is upwardly engaged thereagainst. The depth of such cutting of the butt edge 20 is controlled by the contact with the flatened surfaces 80, that is, when such contact is made, the depth of potential cutting has been determined. Adjustment of such depth is, of course, controlled by moving the posts 78 in or out with respect to the tabs 76.

It should be pointed out that the particular construction of the first and second guide means is illustrative only and that other guide means may be utilized so long as the overall intended purposes of the invention are accomplished—that of simultaneously enabling the depth of cut of both the butt surfaces 20 and the face surfaces 18 to be regulated in the intended manner.

While there is shown and described herein certain specific structure embodying this invention, it will be manifest to those skilled in the art that various modifications and rearrangements of the parts may be made without departing from the spirit and scope of the underlying inventive concept and that the same is not limited to the particular forms herein shown and described except insofar as indicated by the scope of the appended claims.

What is claimed is:

1. A rotary tool for resurfacing a work surface such as a painted shingle or clapboard wall defining a generally flat vertically oriented major surface and an adjacent overlying horizontally oriented minor surface, said tool comprising a housing, a rotatable cutting disc having a generally planar face and a peripheral edge surface, said disc rotatably supported by said housing and means for rotating said disc at high speed about an axis substantially perpendicular to said major work surface, said generally planar disc face having upwardly extending first cutting surfaces provided thereon and said disc peripheral edge surface having radially outwardly extending second cutting surfaces provided thereon such that said rotation permits simultaneous cutting of said major surface by said first cutting surfaces and said minor surface by said second cutting surfaces, said housing further including first and second adjustable guide means adapted to respectively and simultaneously engage said major and minor surfaces so as to regulate the depth to which said disc cuts said major and minor surfaces.

2. The tool as set forth in claim 1, said second outwardly extending cutting surfaces of said peripheral surface being a plurality of saw-toothed radially outwardly extending teeth peripherally spaced about said edge surface, said teeth adapted to cut into the overlying or butt end of said shingles or clapboards of said work surface.

3. The tool as set forth in claim 2, said first outwardly extending cutting surfaces of said disc face being a plurality of arcuately spaced teeth upwardly projecting from said disc face substantially normal thereto.

4. The tool as set forth in claim 3, said first teeth being projections of a selected number of said second teeth.

5. The tool as set forth in claim 3, said first guide means and said second guide means adjustable in substantially perpendicular directions.

* * * * *